Aug. 31, 1926.  
F. J. FAASE  
1,598,070  
ELECTRIC TRIMMING AND SEAM CUTTING MACHINE  
Filed August 30, 1924   2 Sheets-Sheet 1
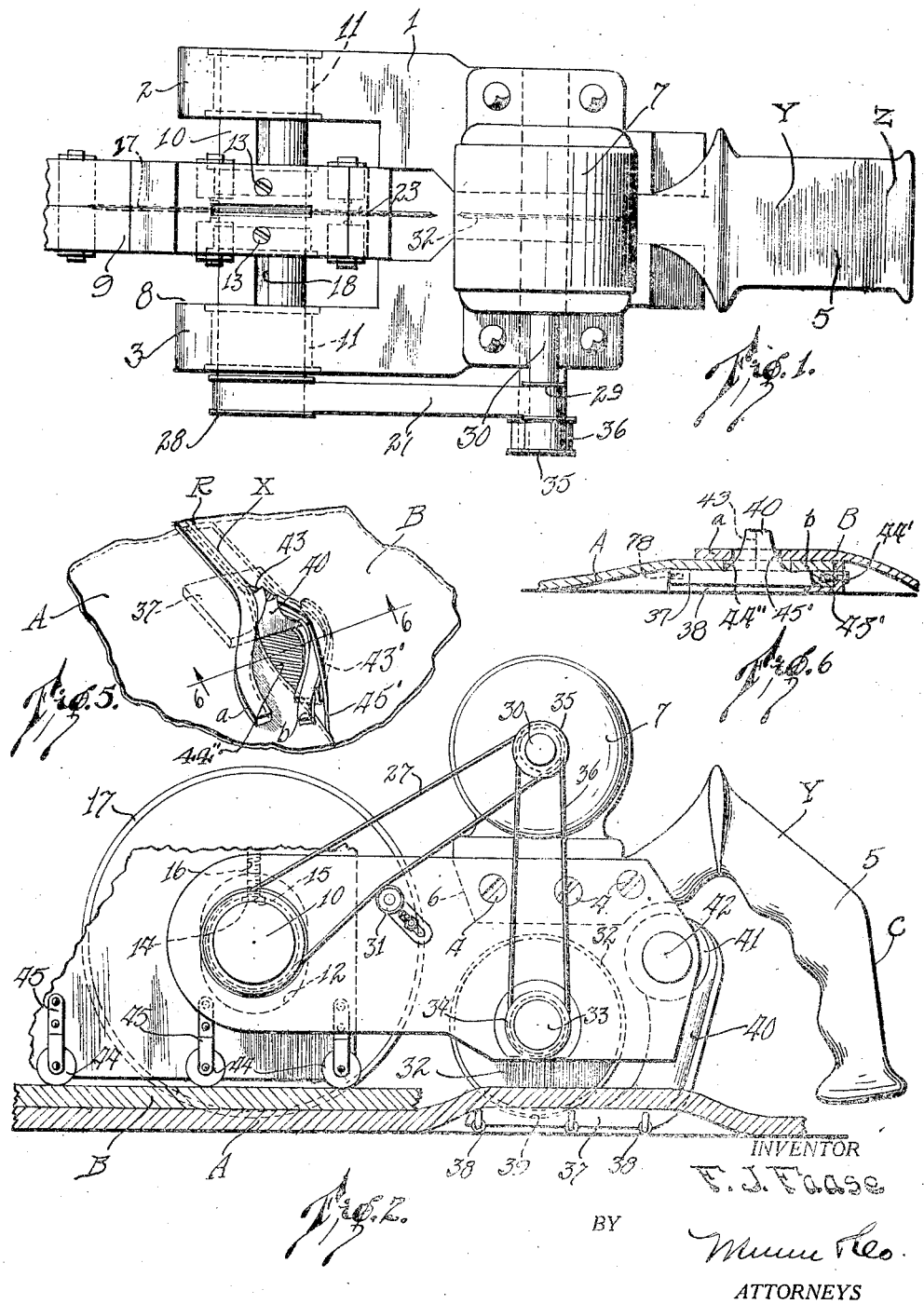
INVENTOR  
F. J. Faase  
BY  
ATTORNEYS

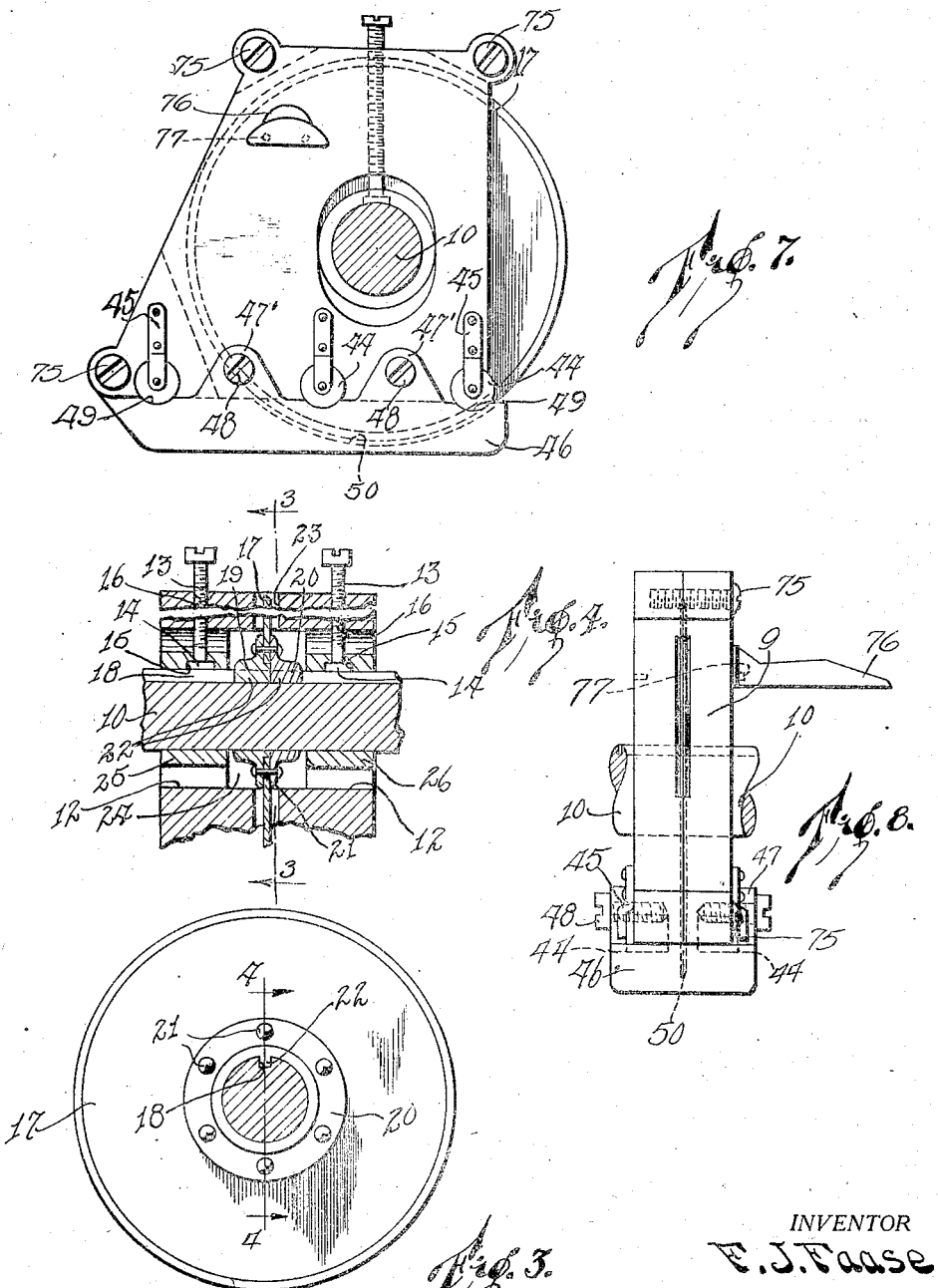

Patented Aug. 31, 1926.

1,598,070

UNITED STATES PATENT OFFICE.

FRANK J. FAASE, OF CORNWALL-ON-HUDSON, NEW YORK.

ELECTRIC TRIMMING AND SEAM-CUTTING MACHINE.

Application filed August 30, 1924. Serial No. 735,123.

My invention relates to improvements in electric trimming and seam cutting machine, and it consists in the combinations, constructions, and arrangements herein described and claimed.

An object of my invention is to provide an electric trimming and seam cutting machine for cutting cork carpet, rubber flooring, battleship linoleum and other similar flooring materials laid in sheet form, which is generally done with hand knives or knives held in plane attachments which are manually operated. With the hand method it is necessary for the operator to pull the knife over the surface to be cut, and it is also necessary to cut each piece of material separately. When the cutting operation is finished, it often happens that the edges of the pieces do not coincide throughout their entire length, which is essential if a neat job is to be done. One of the principal objects of the invention is to provide a cutter that cuts two plies at once, thus assuring an even joining.

In many big linoleum contracts it is essential that the job be finished in a certain given length of time, and it therefore can be seen that when the flooring is cut by hand there is often required a big labor force to accomplish the job within the time limit prescribed.

The principal object of the present invention is to provide an electrical cutter which is adapted to cut various flooring materials such as battleship linoleum at a speed which is far greater than that which can be accomplished by hand, and which is especially adapted for use in cutting what is termed "lapped seam".

A further object of my invention is to provide a machine which is portable and which therefore can be taken to the place in which the installation is to be made.

A further object of my invention is to provide a machine in which the cutters are adjustable so as to adapt the device to cut materials of different thicknesses and in which the cutters are adapted to be aligned with each other so as to cause both cutters to make a single incision in the flooring.

A further object of my invention is to provide a machine in which either one of the cutters may be used independently of the other, for certain types of work.

A further object of my invention is to provide a machine which has novel means for directing the waste strips away from the machine whereby the cut edges of the material will automatically fall into place after the machine has passed thereby.

A further object of my invention is to provide a machine which is simple in construction, durable, and efficient for the purpose intended and which is not likely to get out of order easily.

Other objects and advantages will appear in the following specification, and the novel features of the invention will be particularly pointed out in the appended claims.

My invention is illustrated in the accompanying drawings forming a part of this application, in which—

Figure 1 is a top plan view of the device.

Figure 2 is a side elevation of the device.

Figure 3 is a section along the line 3—3 of Figure 4.

Figure 4 is a section along the line 4—4 of Figure 3.

Figure 5 is a perspective view of a portion of the device.

Figure 6 is a section along the line 6—6 of Figure 5.

Figure 7 is a side elevation of one of the cutters showing an attachment operatively applied thereto, and Figure 8 is a front elevation of Figure 7.

In carrying out my invention I provide a frame 1, comprising two pieces, 2 and 3, which are secured to each other by screws 4 (see Figure 2). A handle 5 having a portion 6 which is disposed between the pieces 2 and 3 is secured in place by means of the screws. The pieces 2 and 3 provide a platform for a motor 7, for a purpose hereinafter described. The pieces 2 and 3 are spaced from each other so as to provide a recess 8 in which a frame 9 is disposed.

In Figure 1 I have shown the frame 9 as being mounted upon a shaft 10, said shaft in turn being carried by the pieces 2 and 3. The shaft 10 is mounted in the bearings 11 the bearings being disposed in the pieces 2 and 3.

In Figures 1, 2, 3, and 4, I have shown the novel construction of the frame 9 and also of the cutter 17. From Figure 4 it will be noted that the shaft 10 is provided with a key way or slot 18. The cutter 17 is mounted in a hub that consists of two pieces 19 and 20 which are bolted to each other by means of bolts 21. The bolts extend through openings in the cutter 17, thereby locking the cutter and pieces 19 and 20 rigidly together. From Figure 3 it will be noted that the pieces 19 and 20 have projections or keys 22 that are slidably received in the key way 18. When the shaft 10 is rotated by the motor 7 it will rotate the cutter 17 due to the fact that the cutter is keyed to the shaft 10. The cutter, however, is adapted to be moved longitudinally along the shaft 10 for a purpose hereinafter described.

The frame 9 has a slot 23 therein which receives the cutter 17. The frame 9 has a recess 24 which receives the hub of the cutter 17. Bearings 25 and 26 are mounted in the frame 9 and receive the shaft 10 so as to permit the shaft to rotate freely in the frame 9. It will be noted from Figures 2 and 4 that the bearings 25 and 26 are received in slots 12 which permits the frame 9 to move with respect to the shaft 10. Bolts 13 are rotatably mounted in threaded bores 16 in the frame 9, and are provided with threads 14 which are received in recesses 15 in the bearings 25 and 26. When the bolts 15 are rotated they will cause the frame 9 to move with respect to the bearings 25 and 26 for a purpose hereinafter described.

In Figure 2 I have shown the cutter 17 as being operatively connected to the motor 7 by means of a belt 27, a pulley 28 which is mounted upon the shaft 10, and a pulley 29 which is mounted upon the shaft 30 of the motor 7. A spring pressed idler pulley 31 bears against the belt 27 and takes up any slack in the belt. A second cutter 32 is carried by the frame 1 and is disposed directly behind the cutter 17 and beneath the motor 7. This cutter is not adapted to move with respect to the frame 1 as is the cutter 17. The cutter 32 is moved upon a shaft 33, which in turn is rotatably disposed in the frame 1. Pulleys 34 and 35 and the belt 36 connect the cutter 32 with the motor 7. The cutter 32 is disposed above a platform 37, this platform being mounted upon rollers 38 which ride upon the surface of the floor. The platform 37 has a groove 39 cut therein which receives the edge of the cutter 32. The platform 37 is connected to the frame 1 by means of an upright portion 40 and a bearing 41. The bearing 41 is rotatably mounted on a screw that is carried by the frame 1. The platform 37 may be shoved beneath the cutter 32 if desired. The upright portion 40 is provided with a knife edge 43 (see Figure 5) for a purpose hereinafter described.

The frame 9 is mounted upon rollers 44 in much the same manner as the platform 37. Brackets 45 secure the rollers 44 to the frame 9. In Figure 1 it will be noted that the front roller 47 extends entirely across the frame 9, while the rear rollers 44 are shorter in length and only extend to a point adjacent to the slot 23. The rollers 44 are provided with trunnions on their ends these being received in the recesses of the frame 9 and in the brackets 45.

From the foregoing description of the various parts of the device the operation thereof may be readily understood. Preparatory to the use of the machine the strips of battle ship linoleum or other similar floor material are laid over the floor to be covered, in much the same manner of procedure when it is cut by hand, and are so placed that the edge of one strip or "breadth" overlaps the edge of the preceding breadth along its entire length and in like manner the edge of each succeeding breadth of material overlaps the edge of the breadth adjacent by one or more inches. The larger portion of the material is cemented to the floor, but a distance of about 8" is allowed adjacent to and parallel with the seam or joint for the purpose of cutting. This additional 8" is cemented after the material has been cut. A line is drawn over the overlapping portions and this line is the guide for the cutters 17 and 32. The machine is now applied to the surface of the material and the first revolving cutting blade 17 is disposed above the line and cuts entirely through the top layer of the material and partially through the second layer. Of course the machine has been previously adjusted by means of bolts 13 so as to adjust the frame 9 with respect to the cutter 17 in order to have the cutter project a distance below the under side of the rollers 44, which is equal to 1½ the thickness of the layer of material to be cut. A flooring of the type described comes in thicknesses of approximately ⅜ of an inch, $\tfrac{3}{16}$, and ⅛. By adjusting the bolts 13 the lowermost portion of the cutter 17 may be raised or lowered with respect to the lowermost portions of the rollers 44 so as to cut through approximately 1½ layers of material. This construction is to prevent the cutter from accidentally cutting into the floor and marring the finish of the floor and also dulling the cutting edge of the cutter.

The machine is now advanced so as to dispose the cutter 32 in the cut already made by the cutter 17 and to also position the platform 37 beneath both layers of the material, being cut. The platform 37 is disposed in the position shown in Figure 2 and this will bring the knife edge 43 into the cut which has been made by the cutters 17 and 32. The frame 1 may be moved laterally with respect to the cutter 17 so as to dispose the cutter 32 in the cut already made by the cutter 17. It is obvious that the cutters 17 and 32 cannot be in direct alignment with each other, due to the fact that the material is bulged up as it passes over the platform 37 and therefore makes the cut slightly to one side or the other of a direct imaginary line extending from the cutter 17. The machine is moved forward along the floor by means of the operator. The operator may grasp the handle 5 in either of two positions shown at $y$ and $c$. In Figures 5 and 6 I have shown novel means for deflecting the waste strips $a$ and $b$ that are cut from the pieces A and B by the device. The platform 37 carries a guide member 43' which is removably secured to the platform by means of bolts 44'. Figure 5 clearly shows how the platform 37 and its upright portion 40 are positioned with respect to the strips $a$ and $b$. The pieces A and B are laid upon the floor and are lapped as at R. The device is moved along the lapped portion and cuts through both layers of material A and B in the manner shown in Figure 5. The strip $a$ of the piece B is directed from the machine by the upright portion 40 while the strip $b$ from the piece A is directed upwardly over the edge 44", as shown in Figure 6, and away from the edge 45'. Both of the edges 44" and 45' abut each other as soon as the machine has been moved away from the point in question. Since both of the edges 44" and 45' are cut simultaneously and by the same cutters 17 and 32, they will coincide with each other through their entire length. This is true even though the line is not perfectly straight. Figure 6 clearly shows that the strips $a$ and $b$ pass on each side of the upright portion 40 and Figure 5 shows how these strips are directed out of the way so as not to interfere with the normal operation of the machine.

Near walls, and in close places, the main rotating blade 17 can be operated independently of the following blade 32. The blade 32 may be kept out of contact with the pieces A and B by merely disposing the platform 37 on top of the pieces. The platform 37 moves on the axis 42 while it is swung out of engagement with the material being cut.

If it is desired to cut only one thickness of material the cutter 17 may be dispensed with and the cutter 32 used in place of the cutter 17. In Figures 7 and 8 I show a novel means for supporting the cutters 17 out of contact with the material being cut. This means comprises a shoe 46 that has lugs 47' which are disposed on each side of the frame 9. Set screws 48 secure the shoe 46 to the frame 9. In the present form of the device the shoe 46 has grooves 49 therein which receive the rollers 44. A shoe 46 makes a sliding contact with the material being cut and keeps the cutter 17 out of engagement with the material. The shoe 46 has a groove 50 therein which receives the lower portion of the cutter. Figure 8 clearly shows the shoe attached to the frame 9 and also shows how the shoe separates the cutter 17 from the material being cut.

Where these materials are laid in corridors and rooms and other spaces on some jobs, there is installed in advance a border of slate, marble, terrazzo, cement or other hard finish border which projects above the sub-floor line the same thickness as that of the material to cover the sub-floors between these borders so that the linoleum or other similar finish fits into the depressed space between these hard finish borders and its surface comes flush with the surface of the borders. Accordingly, the material must be cut to fit flush with the "hard finish border" edge along the entire length of edge. In this cutting operation the "following blade" 32 is disengaged from use by lifting out of line with the first blade, or by detachment from machine. The main blade is applied at the start of a length of material and held flush against the "hard finish border" edge while it rotates cutting the material along the line on which the "hard finish border" edge guides it, and thus making the cut edge of the material coincident with the edge of the "hard finish border."

To fabricate material in mill or warehouse preparatory to shipment to job in different sizes or shapes, the line along which material is to be cut having been given, the machine is applied along this line in the manner heretofore described. This machine is guided in a forward motion over a line and is so designed as to give a clear vision of the cutting blade as it works, whereas in cutting by hand the knife is pulled toward the workman over a line, the handle of the knife and the hands of the workman obscuring the line from the workman's view for a distance of six to ten inches or more of the cutting point. Hand cutting of seams on these materials requires even for ordinary good work a skilled high-wage mechanic. With a little practice this machine can be operated to produce as good or better results by ordinary skilled labor as can be obtained by a journeyman mechanic working with hand tools.

It will be noted from Figures 1 and 7 that the frame 9 is comprised of two pieces which are secured to each other by screws 75. This is for the purpose of permitting the cutter 7 to be removed from the frame 1 and also from the frame 9 when it is desired to substitute a new cutter for the old one. The shaft 10 is first removed from the frame 9, and then the two sections of the frame are freed from each other so as to permit the cutter 17 to be exchanged. The frame 9 is large enough to protect all of the exposed portions of the cutter that will endanger the operator during the ordinary use of the machine. It will be seen, however, that the rear portion of the cutter in Figure 7 is exposed so as to permit an emery wheel or other like sharpening device to engage with the cutter so as to sharpen the latter. During the sharpening operation the cutter is supported by the shoe 46 and is operated by a motor 7. A handle 76 is removably secured to the frame 9 by means of bolts 77. The frame 9 has threaded openings on each side thereof so as to permit the handle 76 to be secured to either side of the frame. In Figures 7 and 8 I have shown the handle as being secured to one side of the frame. The operator grasps the handle 76 with one hand and the handle 5 with the other and in this way guides the machine during the cutting operation.

In Figure 5 I have shown the guide member 43 as being secured to one side of the platform 37 so as to convey the strip $b$ away from the cut edges 44″ and 45′ as is clearly shown in the figure. In case the portion A overlaps the portion B, instead of the arrangement shown in Figure 5, the guide 43′ would be disposed on the opposite side of the platform 37. The platform 37 is provided with threaded bores 78 on each side thereof, these bores being adapted to receive the bolts 44′. It is therefore obvious that I make use of two guide members, one being a right-hand member while the other is a left hand member. Only one of these members is used at a single time.

I claim:

1. A cutter comprising a frame and two cutting blades carried by said frame, one of said blades being adapted to move laterally with respect to the other blade, and means for preventing either of said blades from cutting.

2. A cutter comprising a frame and two cutting blades carried by said frame, one of said blades being adapted to move laterally with respect to the other blade, and means for directing the strips of material cut away, from the machine.

3. A cutter comprising a frame, a cutting blade carried by said frame and adapted to be moved laterally with respect to the frame, means for rotating said blade and a shoe removably secured to said frame for preventing the blade from cutting the material over which the device is moved.

4. A cutter comprising a frame, a blade carried by said frame, means for rotating said blade, and a platform carried by said frame and adapted to be disposed beneath said blade, rollers for supporting said platform, said platform having a groove therein adapted to receive the lower edge of the blade to make the cutting of the blade ineffective.

5. A cutter comprising a frame, a blade carried by said frame, means for rotating said blade, a platform carried by said frame and adapted to be disposed beneath said blade, said platform having a groove therein adapted to receive the lower edge of the blade, and means removably secured to said platform for deflecting the strips of material cut away from the machine.

6. A cutter comprising a frame, two cutting blades carried by said frame, a motor, connections between the motor and the blades for rotating the blades, a housing supporting one of said blades and means for regulating the distance the blade carried by the housing projects below said housing so as to vary the cutting depth of the blade.

7. A cutter comprising a frame, a cutting blade carried by said frame and adapted to cut two plies of material simultaneously, and means for guiding the cut strips of material away from the material being cut whereby the two plies will drop into place after they have been cut by the machine.

8. A cutter comprising a frame, a cutting blade carried by said frame and adapted to cut two plies of material simultaneously, and means for guiding the cut strips of material away from the material being cut whereby the two plies will drop into place after they have been cut by the machine, said means comprising a platform disposed beneath said blade, and strip guiding means secured to said platform for guiding one of the cut strips of material away from the two plies of material being cut.

9. A cutter comprising a frame adapted to be supported by the material being cut and to be moved freely over the material being cut, cutting blades carried by said frame, and means for moving one of the cutters with respect to the frame so as to vary the cutting distance, whereby the cutter is adapted to cut through a number of layers of material and to partially cut through the lowermost layer.

10. A cutter comprising a frame, a cutting blade carried by said frame and adapted to cut two plies of material simultaneously, and means for guiding the cut strips of material away from the material being cut so as to permit the two plies to drop into place after they have been cut by the machine, said means comprising strip guiding means for guiding one of the cut strips disposed beneath the plys away from the two plies of material being cut.

FRANK J. FAASE.